US011832610B2

(12) United States Patent
Grzesiak et al.

(10) Patent No.: US 11,832,610 B2
(45) Date of Patent: Dec. 5, 2023

(54) RHEOLOGICAL MODIFIERS FOR SPRAY DRIFT CONTROL IN AGROCHEMICAL EMULSIONS

(71) Applicants: Rohm and Haas Company, Collegeville, PA (US); Dow Silicones Corporation, Midland, MI (US); Dow Global Technologies LLC, Midland, MI (US)

(72) Inventors: Adam L Grzesiak, Midland, MI (US); Matthew D. Reichert, Richmond, VA (US); Christopher J. Tucker, Midland, MI (US); Stephen L. Wilson, Zionsville, PA (US); Holger Tank, Indianapolis, IN (US); Sudhakar Balijepalli, Midland, MI (US); Milton H. Repollet-Pedrosa, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 612 days.

(21) Appl. No.: 17/050,507

(22) PCT Filed: Apr. 23, 2019

(86) PCT No.: PCT/US2019/028638
§ 371 (c)(1),
(2) Date: Oct. 26, 2020

(87) PCT Pub. No.: WO2019/209779
PCT Pub. Date: Oct. 31, 2019

(65) Prior Publication Data

US 2021/0112806 A1 Apr. 22, 2021

Related U.S. Application Data

(60) Provisional application No. 62/663,781, filed on Apr. 27, 2018.

(51) Int. Cl.
*A01N 25/04* (2006.01)
*A01N 25/10* (2006.01)
*A01N 25/30* (2006.01)
*A01N 25/06* (2006.01)
*A01N 25/08* (2006.01)

(52) U.S. Cl.
CPC ............ *A01N 25/10* (2013.01); *A01N 25/04* (2013.01); *A01N 25/30* (2013.01)

(58) Field of Classification Search
None
See application file for complete search history.

(56) References Cited

U.S. PATENT DOCUMENTS

| | | | |
|---|---|---|---|
| 1,129,052 | A | 2/1915 | Senn |
| 5,874,096 | A | 2/1999 | Hazen et al. |
| 8,835,357 | B2 | 9/2014 | Ouse et al. |
| 8,993,629 | B2 | 3/2015 | Sun |
| 2011/0301033 | A1 | 12/2011 | Wilson et al. |
| 2014/0179529 | A1 | 6/2014 | Downer et al. |
| 2015/0133299 | A1 | 5/2015 | Shao et al. |
| 2015/0150249 | A1 | 6/2015 | Nolte et al. |
| 2015/0296772 | A1 | 10/2015 | Olds et al. |
| 2017/0006859 | A1 | 1/2017 | Raman et al. |

FOREIGN PATENT DOCUMENTS

EP 0825200 A1 2/1998

OTHER PUBLICATIONS

Horiuchi, Teruo, "Physico Chemical Properties of Water Soluble Polymers in Aqueous Solution," School of Science and Engineering, Meisel University, 2009, vol. 60, Issue 12, p. 746.
International Search Report & Written Opinion for related PCT Application PCT/US2019/028638, dated Jul. 17, 2019 (14 pgs).
Oliveira, et al., "Spray Adjuvant Characteristics Affecting Agricultural Spraying Drift"; Journal of Brazilian Association of Agricultural Engineering; vol. 35, No. 1 (Feb. 1, 2015) (6 pgs).
Lewis, et al., "Polymeric Drift Control Adjuvants for Agricultural Spraying"; Macromolecular Chemistry and Physics, vol. 217, No. 20 (Oct. 1, 2016) (20 pgs).
"Acrysol (TM) Rheology Modifiers"; Oct. 1, 2013 (16 pgs).
Wilson, et al., "Interfacial Effects on the Performance of Emulsion-Based Anti-Drift Spray Solutions"; Dow AgroSciences LLC, Proc. 10th International Symposium on Adjuvants for Agrochemicals, 2013, pp. 337-343 (7 pgs).
Qin, et al., "Controlling Droplet-Size Distribution Using Oil Emulsions in Agricultural Sprays"; Dow AgroSciences, Atomization and Sprays, 2010 vol. 20, No. 3, pp. 227-239 (13 pgs).
Miller, et al., "Factors Influencing the Performance of Spray Delivery Systems: A Review of Recent Developments"; Journal of ASTM International, Jun. 2005, vol. 2, No. 6 (13 pgs).

(Continued)

*Primary Examiner* — Alton N Pryor
(74) *Attorney, Agent, or Firm* — Brooks, Cameron & Huebsch PLLC

(57) ABSTRACT

The present disclosure provides for an agrochemical emulsion with reduced spray drift that includes an emulsion pre-mix concentrate, an acrylate-based copolymer, and an aqueous based agrochemical composition. The agrochemical emulsion includes 0.05 to 5 weight percent (wt %) of the emulsion pre-mix concentrate, 0.05 to 5 wt. % of the acrylate-based copolymer and 90 to 99.9 wt. % of the aqueous based agrochemical composition. The emulsion pre-mix concentrate includes 40 to 70 wt. % of an alkylene glycol ether, 10 to 40 wt. % of a vegetable-oil, and a surfactant, where the wt. % of the surfactant is 0.5 to 2 times the wt. % of the vegetable-oil wt. %, where the wt. % values are based on the total weight of the emulsion pre-mix concentrate and the wt. % of the alkylene glycol ether, the vegetable-oil and the surfactant total 100 wt. % of the emulsion pre-mix concentrate. The acrylate-based copolymer has a weight average molecular weight of 0.5 to 1.5 million.

20 Claims, 4 Drawing Sheets

(56) References Cited

OTHER PUBLICATIONS

Miller, et al., "El!ects of formulation on spray nozzle performance for applications from ground-based boom sprayers"; Crop Protection, 2000, 19, 609-615 (7 pgs).
Ellis, et al., "How surface tension of surfactant solutions influences the characteristics of sprays produced by hydraulic nozzles used for pesticide application"; Colloids and Surfaces, Physicochemical and Engineering Aspects 180 (2001) 267-276 (10 pgs).
Ellis, et al., "Dilute Emulsions and Their Effect on the Breakup of the Liquid Sheet Produced by Flat-Fan Spray Nozzles"; Atomization And Sprays, vol. 9, pp. 385-397, 1999 (13 pgs).
Hilz, et al., "Spray drift review: The extent to which a formulation can contribute to spray drift reduction"; Crop Protection, 2013, 44, 75-83 (9 pgs).
Qin, et al., "Modeling the Spray Atomization of Emulsion Embedded Agricultural Solutions" Available online at www.astm.org; J. ASTM Int., 2010, vol. 7, No. 10, paper ID: JAI103040 (9 pgs).
International Preliminary Report on Patentability for related PCT Application PCT/US2019/028638, dated Nov. 5, 2020 (9 pgs).

RHEOLOGICAL MODIFIERS FOR SPRAY DRIFT CONTROL IN AGROCHEMICAL EMULSIONS

This application is a National Stage Application under 35 U.S.C. § 371 of International Application Number PCT/US2019/028638, filed Apr. 23, 2019 and published as WO 2019/209779 on Oct. 31, 2019, which claims the benefit to U.S. Provisional Application 62/663,781, filed Apr. 27, 2018, the entire contents of which are incorporated herein by reference in its entirety

TECHNICAL FIELD

The present disclosure relates generally to agrochemical emulsions and more particularly to rheological modifiers for spray drift control in agrochemical emulsions.

BACKGROUND

A typical agricultural chemical spray process involves atomizing a liquid stream of a diluted agrochemical solution through hydraulic spray nozzles. The spray inherently produces a wide spectrum of spray droplet sizes. The finer droplets have a higher potential for off-target movement or "spray drift", which is of concern due to its potential impact on neighboring crops and livestock, sensitive ecological resources and human health. In fact, fine droplets are the primary contributors to spray drift and a typical value used to estimate the propensity toward spray drift is the volume percentage of the droplet distribution below 150 μm in diameter (% of droplets below 150 μm volume mean diameter (VMD)).

Research has demonstrated that although spray nozzle selection and application parameters are factors to consider in producing the desired droplet size spectrum, the chemical make-up of the spray solution can also affect the droplet size distribution for various kinds of nozzles. For example, the use of an oil phase in forming the spray solution as an agrochemical emulsion can affect the droplet size distribution. To this end, the effect of agrochemical emulsions on the spray droplet size distribution has been demonstrated, where rheological modifiers have also been used in an attempt to minimize the production of fine droplets.

Such rheological modifiers include water soluble polymers such as guar gum, polyethylene oxide and polyacrylamides. However, research has shown that the use of these rheological modifiers typically does not only provide the intended function. For example, certain classes of rheology modifiers, including guar gums, have been shown to reduce spray drift. However, these have been shown to increase the fraction of large droplets (droplets having a diameter over 1 mm), which while reducing spray drift can have the negative effect of decreased efficacy due to large droplets which contain a significant fraction of the active not hitting and/or remaining on the intended leaf surface.

As such, there is a need in the art for improved agrochemical emulsions that help to provide spray drift control in agrochemical formulations.

SUMMARY

The present disclosure provides for improvements in agrochemical emulsions that helps to provide spray drift control in agrochemical formulations. The present invention discloses the use of an acrylate-based copolymer in agrochemical emulsions, where the presence of the acrylate-based copolymer helps to provide spray drift control. As discussed herein, the acrylate-based copolymer is either present in (a) a tank-mix additive concentrate used in forming the agrochemical emulsion or (b) is used with an emulsion pre-mix concentrate along with an aqueous based agrochemical composition in forming the agrochemical emulsion.

The acrylate-based copolymer acts as a rheological modifier in the agrochemical emulsion that helps to reduce the formation of fine droplets (droplets below 150 μm volume mean diameter (VMD)) by as much as 45 percent as compared to the use of other rheological modifiers under comparable conditions. This result is surprising because even though the oil-based emulsion used in agrochemical formulations can help reduce spray drift (the formation of fine droplets below 150 μm VMD) the use of an acrylate-based rheological modifiers with agrochemical emulsions to help further reduce spray drift was not expected to provide such a significant reduction in fine droplet formation as compared to the use of the oil-based emulsion alone or with other rheological modifiers under comparable conditions.

Embodiments of the present disclosure include an agrochemical emulsion that includes an emulsion pre-mix concentrate, an acrylate-based copolymer, and an aqueous based agrochemical composition. For the various embodiments, the agrochemical emulsion includes 0.05 to 5 weight percent (wt. %) of the emulsion pre-mix concentrate, 0.05 to 5 wt. % of the acrylate-based copolymer and 90 to 99.9 wt. % of the aqueous based agrochemical composition, where the wt. % is based on the total weight of the agrochemical emulsion. For the various embodiments, the emulsion pre-mix concentrate includes 40 to 70 wt. % of an alkylene glycol ether, 10 to 40 wt. % of a vegetable-oil, and a surfactant, where the wt. % of the surfactant is 0.5 to 2 times the wt. % of the vegetable-oil wt. %, where the wt. % values are based on the total weight of the emulsion pre-mix concentrate and the wt. % of the alkylene glycol ether, the vegetable-oil and the surfactant total 100 wt. % of the emulsion pre-mix concentrate. For the various embodiments, the acrylate-based copolymer has a weight average molecular weight of 0.5 to 1.5 million.

The present disclosure also provides for a tank-mix additive concentrate, where the tank-mix additive concentrate includes all the components of the agrochemical emulsion described herein, except it does not include the aqueous based agrochemical composition. Specifically, the tank-mix additive concentrate includes the emulsion pre-mix concentrate and the acrylate-based copolymer, where the tank-mix additive concentrate has a 1:1 to 1:10 ratio by weight of the emulsion pre-mix concentrate to the acrylate-based copolymer. The tank-mix additive concentrate forms an agrochemical emulsion upon dilution in an aqueous based agrochemical composition. As discussed herein, the emulsion pre-mix concentrate includes 40 to 70 wt. % of an alkylene glycol ether, 10 to 40 wt. % of the vegetable-oil, and the surfactant, where the wt. % of the surfactant is 0.5 to 2 times the wt. % of the vegetable-oil wt. %, where the wt. % values of the emulsion pre-mix concentrate are based on the total weight of the emulsion pre-mix concentrate and the wt. % of the alkylene glycol ether, the vegetable-oil and the surfactant total 100 wt. % of the emulsion pre-mix concentrate. As mentioned, the acrylate-based copolymer has a weight average molecular weight of 0.5 to 1.5 million.

For the various embodiments of the agrochemical emulsion or the tank-mix additive, the acrylate-based copolymer is an acrylate-based random copolymer formed with monomers (A), (B) and (C), where monomer (A) is an α, β ethylenically unsaturated carboxylic acid monomers; monomer (B) is a nonionic, copolymerizable α, β ethylenically unsaturated monomer and monomer (C) is a hydrophobically modified α, β ethylenically unsaturated carboxylic acid monomer. For the various embodiments, the acrylate-based random copolymer of monomers (A), (B) and (C) is formed with 30 to 60 wt. % of monomer (A), 30 to 50 wt. % of monomer (B) and 0 to 15 wt. % of monomer (C), where the wt. % is based on the total weight of the acrylate-based random copolymer and the monomers (A), (B) and (C) total 100 wt. %. Preferably, monomer (A) is methacrylic acid or acrylic acid; monomer (B) is ethyl acrylate, methyl methacrylate or butyl acrylate; and monomer (C) is a methacrylated alkyl EO/PO ester.

For the various embodiments of the agrochemical emulsion or the tank-mix additive, the alkylene glycol ether is selected from the group consisting of propylene glycol n-butyl ether, dipropylene glycol methyl ether, dipropylene glycol n-propyl ether, propylene glycol n-propyl ether, dipropylene glycol n-butyl ether, ethylene glycol monohexyl ether, ethylene glycol mono-n-propyl ether, diethylene glycol monohexyl ether, ethylene glycol mono-n-propyl ether, diethylene glycol monohexyl ether, diethylene glycol monobutyl ether, triethylene glycol monobutyl ether or combinations thereof. In one embodiment for either the agrochemical emulsion or the tank-mix additive, the alkylene glycol ether is a dipropylene glycol methyl ether.

For the various embodiments of the agrochemical emulsion or the tank-mix additive, the vegetable-oil is selected from the group consisting almond oil, canola oil, soybean oil, rapeseed oil, olive oil, castor oil, sunflower seed oil, coconut oil, corn oil, cotton seed oil, linseed oil, palm oil, peanut oil, safflower oil, sesame oil, tung oil or combinations thereof. In additional embodiments of the agrochemical emulsion or the tank-mix additive, the vegetable-oil is a methylated vegetable-oil. For the various embodiments of the agrochemical emulsion or the tank-mix additive, the surfactant can be a phosphate ester surfactant, a polymeric surfactant or combinations thereof. Other surfactants are also possible. For the various embodiments, the aqueous based agrochemical composition contains an herbicide, an insecticide, a fungicide or combinations thereof. For the various embodiments, the agrochemical emulsion has a pH of 5 to 9.5 measured at a temperature of 23 C. For the various embodiments, the tank-mix additive concentrate has a pH of 5 to 8 measured at a temperature of 23 C.

Embodiments of the present disclosure also provide for a method of reducing spray drift during agrochemical composition spray application, which include providing the tank-mix additive concentrate, as discussed herein, and adding the tank-mix additive concentrate to a spray tank with an aqueous based agrochemical composition to form the agrochemical emulsion and spraying the agrochemical emulsion from a sprayer.

DETAILED DESCRIPTION

Figure 1:
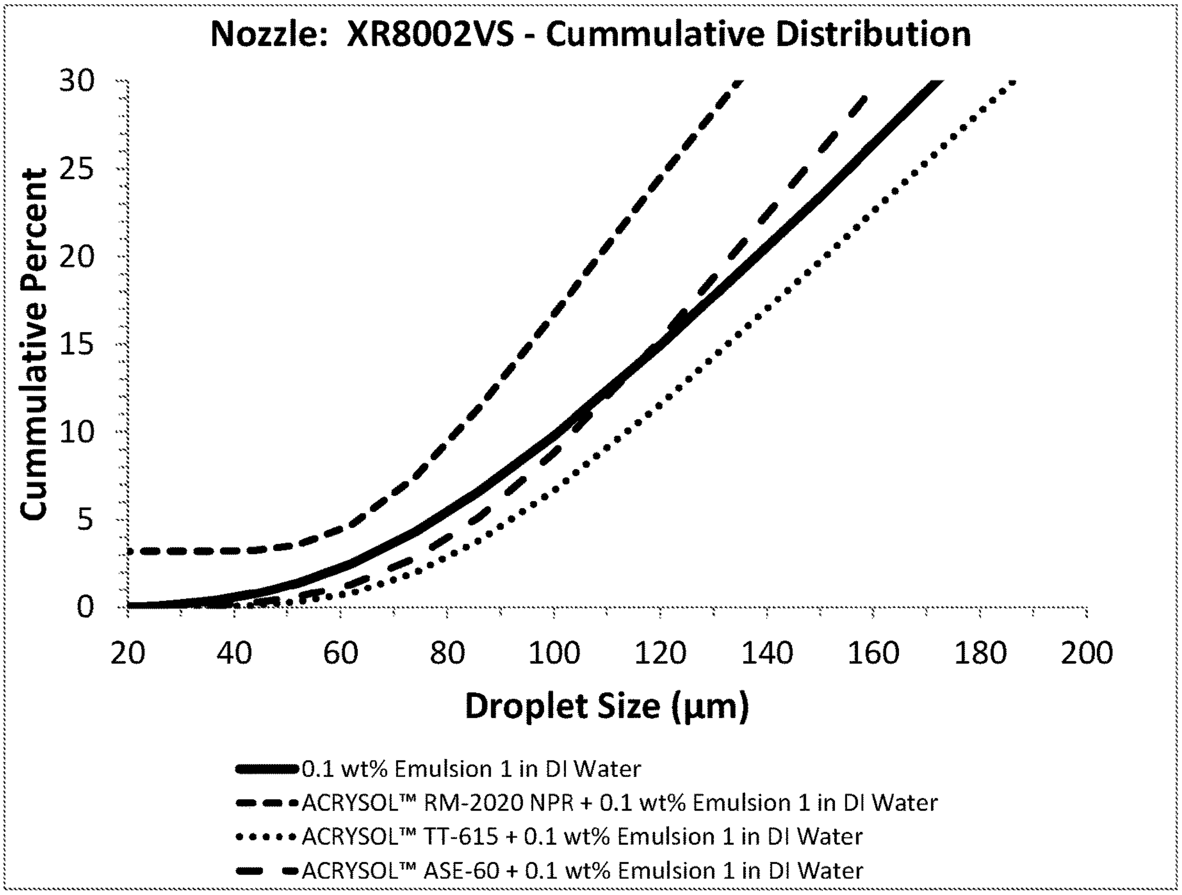
FIG. 1 illustrates a reduction in volume of droplets below about 100 μm when ACRYSOL™ ASE-60 is utilized in combination with Emulsion 1 (Example 1) and a reduction of in volume of droplets below the cutoff of 150 μm when ACRYSOL™ TT-615 is utilized in combination with Emulsion 1 using a standard nozzle type XR8002VS as seen in Example 2.

The present disclosure provides for improvements in agrochemical emulsions that helps to provide spray drift control in agrochemical formulations. The present invention discloses the use of an acrylate-based copolymer in agrochemical emulsions, where the presence of the acrylate-based copolymer helps to provide spray drift control. As discussed herein, the acrylate-based copolymer is either present in (a) a tank-mix additive concentrate used in forming the agrochemical emulsion or (b) is used with an emulsion pre-mix concentrate along with an aqueous based agrochemical composition in forming the agrochemical emulsion.

The acrylate-based copolymer acts as a rheological modifier in the agrochemical emulsion that helps to reduce the formation of fine droplets (droplets below 150 μm volume mean diameter (VMD)) by as much as 45 percent as compared to the use of other rheological modifiers under comparable conditions. This result is surprising because even though the oil-based emulsion used in agrochemical formulation can help reduce spray drift (the formation of fine droplets below 150 μm VMD) the use of an acrylate-based rheological modifiers with agrochemical emulsions to help further reduce spray drift was not expected to provide such a significant reduction in fine droplet formation as compared to the use of the oil-based emulsion alone or with other rheological modifiers under comparable conditions.

Embodiments of the present disclosure include an agrochemical emulsion that includes an emulsion pre-mix concentrate, an acrylate-based copolymer, and an aqueous based agrochemical composition. As noted above, the acrylate-based copolymer is a rheological modifier that helps to provide spray drift control for the agrochemical emulsion. For the various embodiments, the acrylate-based copolymer has a weight average molecular weight of 0.5 to 1.5 million. Preferably, the acrylate-based copolymer has a weight average molecular weight of 0.8 to 1.2 million. Most preferably, the acrylate-based copolymer has a weight average molecular weight of 0.8 to 1.0 million. For the various embodiments, the weight average molecular weight is measured using size exclusion chromatography with polystyrene standards.

The acrylate-based copolymer used in the agrochemical emulsion described herein may be anionic in character. For the various embodiments, the acrylate-based copolymer is an acrylate-based random copolymer formed with monomers (A), (B) and (C), where:

(A) is an α, β ethylenically unsaturated carboxylic acid monomer of Formula I:

Formula I

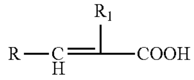

where R is H and $R_1$ is H, C1-C4 alkyl, or —$CH_2COOX$; R is —COOX and $R_1$ is H or —$CH_2COOX$; and R is $CH_3$ and $R_1$ is H, C1-C4 alkyl or —$CH_2COOX$; and X is H or C1-C4 alkyl;

(B) is a nonionic, copolymerizable α, β ethylenically unsaturated monomer of Formula II:

Formula II

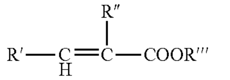

where R' is H or $CH_3$ and R" is H or $CH_3$ and R''' C1 to C4 alkyl; and (C) is a hydrophobically modified α, β ethylenically unsaturated carboxylic acid monomer of Formula III:

Formula III

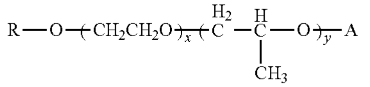

where R is an alkyl group of 6 to 22 carbon atoms or an alkaryl of 8 to 22 carbon atoms, x is an average number of from about 6 to 200, y is an average number of from about 0 to 50 and A is residue of an unsaturated carboxylic acid having the formula:

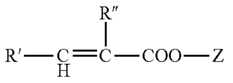

Where R' is H, —COOH or $CH_3$ and R" is H, $CH_3$, —COOH or —$CH_2COOH$ and Z is the hydrophobic residue shown above in Formula III.

The acrylate-based random copolymer of monomers (A), (B) and (C) is formed with 30 to 60 wt. % of monomer (A), 30 to 50 wt. % of monomer (B) and 0 to 15 wt. % of monomer (C), where the wt. % of monomers (A), (B) and (C) total 100 wt. %. Preferably, acrylate-based random copolymer of monomers (A), (B) and (C) is formed with 45 to 55 wt. % of monomer (A), 40 to 50 wt. % of monomer (B) and 8 to 12 wt. % of monomer (C), where the wt. % of monomers (A), (B) and (C) total 100 wt. %. Preferably, monomer (A) is methacrylic acid or acrylic acid; monomer (B) is ethyl acrylate, methyl methacrylate or butyl acrylate; and monomer (C) is a methacrylated alkyl EO/PO ester, where the preferred range for the degree of polymerization of ethylene oxide (EO) is from 10 to 30 and for propylene oxide (PO) is from 0 to 10. Preferably, the R group for monomer (C) is an alkyl group of 10 to 22 carbon atoms.

Acrylate-based copolymer as provided herein can be formed according to known techniques. Examples include those provided in US Pat. Pub. No. 2012/0129739 A1; US Pat. Pub. No. 2002/0042448 A1; US Pat. Pub. No. 2011/0065836 A1; US Pat. Pub. No. 2011/0213072 A1; US Pat. Pub. No. 2003/0207988 A1; US Pat. Pub. No. 2002/0042448 A1; U.S. Pat. Nos. 4,384,096; 4,421,902; 4,514,552; 4,892,916; 5,362,415; 5,294,692; 5,412,142; and 6,762,269; 8,362,180, incorporated herein by reference.

Examples of commercially available acrylate-based copolymers include ACRYSOL™ ASE-60, ACRYSOL™ TT-615, ACRYSOL™ DR-106, ACRYSOL™ DR-110 ER, ACRYSOL™ DR-130, ACRYSOL™ TT-935 ER, ACRYSOL™ RM-935, ACRYSOL™ RM-55, ACULYN™ Excel, ACULYN™ 22, ACULYN™ 28, ACULYN™ 38, ACULYN™ 44, ACULYN™ 46N, ACULYN™ 88, ACUSOL™ 810A, ACUSOL™ 830, ACUSOL™ 835, ACUSOL™ 842, ACUSOL™ 801S, ACUSOL™ 805S, ACUSOL™ 820, and ACUSOL™ 823.

The emulsion pre-mix concentrate of the present disclosure includes 40 to 70 wt. % of an alkylene glycol ether, 10 to 40 wt. % of a vegetable-oil, and a surfactant, where the wt. % of the surfactant is 0.5 to 2 times the wt. % of the vegetable-oil wt. %. Preferably, the emulsion pre-mix concentrate includes 40 to 65 wt. % of the alkylene glycol ether, 15 to 30 wt. % of the vegetable-oil, where the wt. % of the surfactant is 0.5 to 1 times the wt. % of the vegetable-oil wt. %. Most preferably, the emulsion pre-mix concentrate includes 45 to 55 wt. % of the alkylene glycol ether, 20 to 30 wt. % of the vegetable-oil, where the wt. % of the surfactant is 0.75 to 1 times the wt. % of the vegetable-oil wt. %. For each of the above embodiments, the wt. % values are based on the total weight of the emulsion pre-mix concentrate and the wt. % of the alkylene glycol ether, the vegetable-oil and the surfactant total 100 wt. % of the emulsion pre-mix concentrate.

The alkylene glycol ether, the vegetable-oil and the surfactant of the emulsion pre-mix concentrate can be admixed at room temperature (23° C.). The emulsion pre-mix concentrate can also be stored at a temperature in the range of 0 to 50 C. For the various embodiments, the emulsion pre-mix concentrate can have a pH of 5 to 8 measured at a temperature of 23 C.

For the various embodiments, the alkylene glycol ether is selected from the group consisting of propylene glycol n-butyl ether, dipropylene glycol methyl ether, dipropylene glycol n-propyl ether, propylene glycol n-propyl ether, dipropylene glycol n-butyl ether, ethylene glycol monohexyl ether, ethylene glycol mono-n-propyl ether, diethylene glycol monohexyl ether, ethylene glycol mono-n-propyl ether, diethylene glycol monohexyl ether, diethylene glycol monobutyl ether, triethylene glycol monobutyl ether or combinations thereof. In one embodiment, the alkylene glycol ether is a dipropylene glycol methyl ether. Preferably the alkylene glycol ether is water soluble.

For the various embodiments, the vegetable-oil is a vegetable or seed oil such as, for example, almond oil, canola oil, soybean oil, rapeseed oil, olive oil, castor oil, sunflower seed oil, coconut oil, corn oil, cotton seed oil, linseed oil, palm oil, peanut oil, safflower oil, sesame oil, tung oil or combinations thereof. In additional embodiments of the agrochemical emulsion or the tank-mix additive, the vegetable-oil is a methylated vegetable-oil.

For the various embodiments, the surfactant for the emulsion pre-mix concentrate can be selected from nonionic surfactants, cationic surfactants, anionic surfactants, and/or amphoteric surfactants. Examples of the nonionic surfactant include polyoxyethylene alkyl ether, polyoxyethylene alkyl aryl ether, polyoxyethylene lanolin alcohol, polyoxyethylene alkylphenol formalin condensate, polyoxyethylene sorbitan fatty acid ester, polyoxyethylene glyceryl monofatty acid ester, polyoxypropylene glycol monofatty acid ester, polyoxyethylene sorbitol fatty acid ester, polyoxyethylene castor oil derivative, polyoxyethylene fatty acid ester, higher fatty acid glycerol ester, sorbitan fatty acid ester, sucrose fatty acid ester, polyoxyethylene polyoxypropylene block polymer, polyoxyethylene fatty acid amide, alkylol amide, polyoxyethylene alkylamine, polyoxyethylene alkanediol and copolymers of polyoxyethylene and fatty acid esters.

Examples of the cationic surfactant include alkylamine hydrochlorides such as dodecylamine hydrochloride; alkyl quaternary ammonium salts such as dodecyltrimethyl ammonium salt, alkyldimethylbenzyl ammonium salt, alkylpyridinium salt, alkylisoquinolinium salt and dialkylmorpholinium salt; benzethonium chloride, and polyalkyl vinyl pyridinium salt.

Examples of the anionic surfactant include fatty acid sodium such as sodium palmitate; sodium ether carboxylate such as sodium polyoxyethylene lauryl ether carboxylate; amino acid condensates of higher fatty acid, such as sodium lauroyl sarcosine and sodium N-lauroyl glutamate; higher fatty acid ester sulfonates such as higher alkyl sulfonate and lauric acid ester sulfonic acid salt; dialkyl sulfosuccinates such as dioctyl sulfosuccinate; higher fatty acid amide sulfonates such as oleic acid amide sulfonic acid; alkyl aryl sulfonates such as sodium dodecylbenzene sulfonate and diisopropyl naphthalene sulfonate; higher alcohol sulfuric acid ester salts such as formalin condensate of alkyl aryl sulfonate and pentadecane-2-sulfate; polyoxyethylene alkyl phosphoric acid ester salt such as dipolyoxyethylene dodecyl ether phosphate ester; styrene-maleic acid copolymer; lignin sulfonate; and polyoxyalkylene aryl phenyl ether phosphoric acid ester salt.

Examples of the amphoteric surfactant include N-laurylalanine, N,N,N-trimethylaminopropionic acid, N,N,N-trihydroxyethylaminopropionic acid, N-hexyl-N,N-dimethylaminoacetic acid, 1-(2-carboxyethyl)pyridinium betaine, and lecithin.

Among the above surfactants, phosphate ester surfactants, polymeric surfactants or combinations thereof are preferred. Examples of phosphate ester surfactants include those commercially available under the tradename Atox™, for example Atox™ DP 13/6 commercially available from Croda International Plc.

As discussed herein, the agrochemical emulsion includes 0.05 to 5 wt. % of the emulsion pre-mix concentrate, 0.05 to 5 wt. % of the acrylate-based copolymer and 90 to 99.9 wt. % of the aqueous based agrochemical composition. Preferably, the agrochemical emulsion includes 0.07 to 3 wt. % of the emulsion pre-mix concentrate, 0.07 to 4 wt. % of the acrylate-based copolymer and 93 to 99.86 wt. % of the aqueous based agrochemical composition. Most preferably, the agrochemical emulsion includes 0.1 to 2 wt. % of the emulsion pre-mix concentrate, 0.1 to 2 wt. % of the acrylate-based copolymer and 96 to 99.8 wt. % of the aqueous based agrochemical composition.

The agrochemical emulsion also includes the aqueous based agrochemical composition. As used herein, the aqueous based agrochemical composition is a water-based composition that includes at least one of a chemical compound, besides water, that is capable of exhibiting activity as an agricultural chemical in an effective amount as dissolved or dispersed in the water of the aqueous based agrochemical composition. For the various embodiments, the aqueous based agrochemical composition contains an herbicide, an insecticide, a fungicide or combinations thereof. For the various embodiments, the aqueous based agrochemical composition can include 0.1 wt. % to 3 wt. % of the herbicide, the insecticide, the fungicide or combinations thereof, where the wt. % is based on the total weight of the aqueous based agrochemical composition. Other values for the wt. % of the herbicide, the insecticide, the fungicide or combinations thereof present in the aqueous based agrochemical composition are also possible (e.g. values less than 0.1 wt. % and/or values greater than 3 wt. %).

Examples of herbicides for the aqueous based agrochemical composition used in the agrochemical emulsion and with the tank-mix additive include one or more of 4-CPA, 4-CPB, 4-CPP, 2,4-D, 3,4-DA, 2,4-DB, 3,4-DB, 2,4-DEB, 2,4-DEP, 3,4-DP, 2,4,5-T, 2,4,5-TB, 2,3,6-TBA, allidochlor, acetochlor, acifluorfen, aclonifen, alachlor, alloxydim, alorac, ametridione, ametryn, amibuzin, amicarbazone, amidosulfuron, aminocyclopyrachlor, aminopyralid, aminopyralid, amiprofos-methyl, amitrole, anilofos, anisuron, asulam, asulam, atraton, atrazine, azafenidin, azimsulfuron, aziprotryne, barban, BCPC, beflubutamid, benazolin, bencarbazone, benfluralin, benfuresate, bensulfuron, bensulide, bentazone, benzadox, benzfendizone, benzipram, benzobicyclon, benzofenap, benzofluor, benzoylprop, benzthiazuron, bicylopyrone, bifenox, bilanafos, bilanafos, bispyribac, bromacil, bromobonil, bromobutide, bromofenoxim, bromoxynil, brompyrazon, butachlor, butafenacil, butamifos, butenachlor, buthidazole, buthiuron, butralin, butroxydim, buturon, butylate, cafenstrole, cafenstrole, cambendichlor, carbasulam, carbasulam, carbetamide, carboxazole chlorprocarb, carfentrazone, CDEA, CEPC, chlomethoxyfen, chloramben, chloranocryl, chlorazifop, chlorazine, chlorbromuron, chlorbufam, chloreturon, chlorfenac, chlorfenprop, chlorflurazole, chlorflurenol, chloridazon, chlorimuron, chlornitrofen, chloropon, chlorotoluron, chloroxuron, chloroxynil, chlorpropham, chlorsulfuron, chlorthal, chlorthiamid, cinidon-ethyl, cinmethylin, cinosulfuron, cisanilide, clethodim, cliodinate, clodinafop, clofop, clomazone, clomeprop, clomeprop, cloprop, cloproxydim, clopyralid, clopyralid, cloransulam, CPMF, CPPC, credazine, cumyluron, cyanatryn, cyanazine, cycloate, cyclosulfamuron, cycloxydim, cycluron, cyhalofop, cyperquat, cyprazine, cyprazole, cypromid, daimuron, dalapon, dazomet, delachlor, desmedipham, desmetryn, diallate, dicamba, dichlobenil, dichloralurea, dichlormate, dichlorprop, dichliorprop-P, diclofop, diclosulam, diethamquat, diethatyl, difenopenten, difenoxuron, difenzoquat, diflufenican, diflufenzopyr, dimefuron, dimepiperate, dimethachlor, dimethametryn, dimethenamid, dimethenamid-P, dimexano, dimidazon, dinitramine, dinitramine, dinofenate, dinoprop, dinosam, dinoseb, dinoterb, diphenamid, dipropetryn, diquat, disul, dithiopyr, diuron, DMPA, DNOC, EBEP, eglinazine, endothal, epronaz, epronaz, EPTC, ebon, esprocarb, ethalfluralin, ethametsulfuron, ethidimuron, ethiolate, ethofumesate, ethoxyfen, ethoxysulfuron, etinofen, etnipromid, etnipromid, etnipromid, etobenzanid, EX), fenasulam, fenasulam, fenasulan, fenoprop, fenoxaprop, fenoxaprop-P, fenoxasulfone, fenteracol, fenthiaprop, fentrazamide, fenuron, flamprop, flamprop-M, flazasulfuron, florasulam, fluazifop, fluazifop-P, fluazolate, flucarbazone, flucetosulfuron, fluchloralin, flufenacet, flufenican, flufenpyr, flumetsulam, flumezin, flumiclorac, flumioxazin, flumipropyn, fluometuron, fluorodifen, fluoroglycofen, fluoromidine, fluoronitrofen, fluothiuron, flupoxam, flupoxam, flupropacil, flupropanate, flupyrsulfiiron, fluridone, fluorochloridone, fluoroxypyr, flurtamone, fluthiacet, fomesafen, fomesafen, foramsulfuron, fosamine, furyloxyfen, glufosinate, glyphosate, halauxifen, halosafen, halosafen, halosulfuron, haloxydine, haloxyfop, haloxyfop-P, hexazinone, imazamethabenz, imazamox, imazapic, imazapyr, imazaquin, imazethapyr, imazosulfuron, indanofan, indaziflam, iodobonil, iodosulfuron, ioxynil, ipazine, ipfencarbazone, iprymidam, isocarbamid, isocil, isomethiozin, isonoruron, isopolinate, isopropalin, isoproturon, isouron, isoxaben, isoxachlortole, isoxaflutole, isoxapyrifop, karbutilate, ketospiradox, lactofen, lenacil, linuron, MCPA, MCPA-thioethyl, MCPB, mecoprop, mecoprop-P, medinoterb, mefenacet, mefluidide, mesoprazine, mesosulfuron, mesotrione, metam, metanifop, netamifop, metamitron, metazachlor, metazosulfuron, metflurazon, methabenzthiazuron, methalpropalin, methazole, methiobencarb, methiozolin, methiuron, methiuron, methometon, methoprotryne, methyldymron, metobenzuron, metobromuron, metolachlor, S-metolachlor, metosulam, metoxuron, metribuzin, metsulfuron, molinate, monalide, monisouron, monochloroacetic acid, monolinuron, monuron, morfarnquat, naproanilide, napropamide, naptalam, neburon, nicosulfuron, nipyraclofen, nitralin, nitrofen, nitrofluorfen, norflurazon, noruron, OCH, orbencarb, orthosulfamuron, oryzalin, oryzalin, oxadiargyl, oxadiazon, oxapyrazon, oxasulfuron, oxaziclomefone, oxyfluorfen, parafluoron, paraquat, pebulate, pelargonic acid, pendimethalin, penoxsulam, pentanochlor, pentoxazone, perfluidone, pethoxamid, phenisopham, phenmedipham, phenmedipham-ethyl, phenobenzuron, picloram, picloram, picolinafen, picolinafen, pinoxaden, piperophos, pretilachlor, primisulfuron, procyazine, prodiamine, prodiamine, profluazol, profluralin, profoxydim, proglinazine, prometon, prometryn, propachlor, propanil, propaquizafop, propazine, propham, propisochlor, propoxycarbazone, propyrisulfuron, propyzamide, prosulfalin, prosulfocarb, prosulfuron, proxan, prynachlor, pydanon, pyraclonil, pyraflufen, pyrasulfotole, pyrazolynate, pyrazosulfuron, pyrazoxyfen, pyribenzoxim, pyributicarb, pyriclor, pyridafol, pyridate, pyriftalid, pyriminobac, pyrimisulfan, pyrithiobac, pyroxasulfone, pyroxsulam, quinclorac, quinmerac, quinoclamine, quinonamid, quizalofop, quizalofop-P, rhodethanil, rimsulfuron, sebuthylazine, secbumeton, sethoxydim, siduron, simazine, simeton, simetryn, sulcotrione, sulfallate, sulfentrazone, sulfometuron, sulfosulfuron, sulglycapin, swep, tebutam, tebuthiuron, tefuryltrione, tembotrione, tepraloxydim, terbacil, terbucarb, terbuchlor, terburneton, terbuthylazine, terbutryn, tetrafluoron, thenylchlor, thiazafluoron, thiazopyr and triclopyr, thidiazimin, thidiazuron, thidiazuron, thiencarbazone-methyl, thifensulfuron, thiobencarb, tiocarbazil, tioclorim, topramezone, tralkoxydim, tri-allate, triasulfuron, triaziflam, tribenuron, tricamba, tridiphane, trietazine, trifloxysulfuron, trifluralin, triflusulfuron, trifop, trifopsime, trihydroxytriazine, trimeturon, tripropindan, tritac, tritosulfuron, vemolate, xylachlor, and compounds of the following Formula

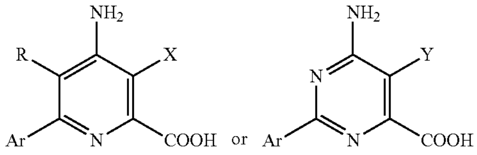

wherein Ar represents a phenyl group substituted with one to four substituents independently selected from halogen, $C_1$-$C_6$ alkyl, $C_1$-$C_6$ alkoxy, $C_2$-$C_4$alkoxyalkyl, $C_2$-$C_6$ alkylcarbonyl, $C_1$-$C_6$ alkylthio, $C_1$-$C_6$ haloalkyl, $C_1$-$C_6$ haloalkoxy, $C_2$-$C_4$ haloalkoxyalkyl, $C_2$-$C_6$haloalkylcarbonyl, $C_1$-$C_6$ haloalkylthio, —$OCH_2CH_2$—, —$OCH_2CH_2CH_2$—, —$OCH_2O$— or —$OCH_2CH_2O$—; R represents H or F; X represents Cl or vinyl; and Y represents Cl, vinyl or methoxy; and their salts and esters as disclosed, for example, in U.S. Pat. No. 7,314,849 B2, U.S. Pat. No. 7,300,907 B2, U.S. Pat. No. 7,786,044B2 and U.S. Pat. No. 7,642,220 B2.

Suitable herbicides for the aqueous based agrochemical composition used in the agrochemical emulsion and with the tank-mix additive include auxinic herbicides such as 2,4-D, 2,4-DB, aminocyclopyrachlor, aminopyralid, clopyralid, dicamba, fluoroxypyr, halauxifen, MCPA, MCPB, picloram or triclopyr, acetochlor, atrazine, benfluralin, cloransulam, cyhalofop, diclosulam, dithiopyr, ethalfluralin, florasulam, flumetsulam, glufosinate, glyphosate, haloxyfop, isoxaben, MSMA, oryzalin, oxyfluorfen, pendimethalin, penoxsulam, propanil, pyroxsulam, quizalofop, tebuthiuron, trifluralin, and the compound of the Formula

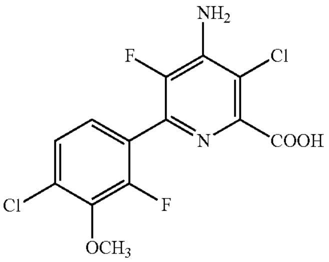 [SMILES: COc1c(Cl)ccc(-c2nc(C(=O)O)c(Cl)c(N)c2F)c1F]

and its $C_1$-$C_{12}$ alkyl or $C_7$-$C_{12}$ arylalkyl ester or salt derivatives such as, for example, the benzyl ester.

Especially suitable herbicides useful with the aqueous based agrochemical composition used in the agrochemical emulsion and with the tank-mix additive include auxinic herbicides such as, for example, clopyralid, triclopyr, 2,4-D, 2,4-DB, MCPA, MCPB, aminocyclopyrachlor, dicamba, aminopyralid, picloram or combinations thereof. The methods for reducing spray drift during pesticide spray mixture application described herein are most particularly useful for the application of herbicides that are subject to restricted applications around sensitive crops such as spray mixtures containing glyphosate, 2,4-D, triclopyr, dicamba or combinations thereof.

Examples of insecticides for the aqueous based agrochemical composition used in the agrochemical emulsion and with the tank-mix additive include one or more of abamectin, acephate, acetamiprid, acethion, acetoprole, acrinathrin, alanycarb, aldicarb, aldoxycarb, allethrin, allosamidin, allyxycarb, amidithion, aminocarb, amiton, amitraz, anabasine, athidathion, azadirachtin, azamethiphos, azinphos-ethyl, azinphos-methyl, azothoate, barthrin, bendiocarb, benfuracarb, bensultap, bifenthrin, bioallethrin, bioethanomethrin, biopermethrin, bioresmethrin, bistrifluoron, bromfenvinfos, bromophos, bromophos-ethyl, bufencarb, buprofezin, butacarb, butathiofos, butocarboxim, butonate, butoxycarboxim, cadusafos, carbanolate, carbaryl, carbofuran, carbophenothion, carbosulfan, cartap, chlorantraniliprole (rynaxypyr), chlordimeform, chlorethoxyfos, chlorfenapyr, chlorfenvinphos, chlorfluazuron, chlormephos, chlorphoxim, chlorprazophos, chlorpyrifos, chlorpyrifos-methyl, chlorthiophos, chromafenozide, cinerin I, cinerin II, cinerins, cismethrin, cloethocarb, closantel, clothianidin, coumaphos, coumithoate, crotamiton, crotoxyphos, crufomate, cyanofenphos, cyanophos, cyanthoate, cyantraniliprole, cyazypyr, cyclethrin, cycloprothrin, cyfluthrin, beta-cyluthrin, cyhalothrin, gamma-cyhalothrin, lambda-cyhalothrin, cypermethrin, alpha-cypermethrin, beta-cypernethrin, theta-cypermethrin, zeta-cypermethrin, cyphenothrin, cyromazine, cythioate, decarbofuran, deltamethrin, demephion, demephion-O, demephion-S, demeton, demeton-methyl, demeton-O, demeton-O-methyl, demeton-S, demeton-S-methyl, demeton-S-methylsulphon, diafenthiuron, dialifos, dialifos, diazinon, dicapthon, dichlofenthion, dichlorvos, dicresyl, dicrotophos, dicyclanil, diflubenzuron, dimefluthrin, dimefox, dimethoate, dimethrin, dimethylvinphos, dimetilan, dimitan, dinex, dinoprop, dinosam, dinotefuran, diofenolan, dioxabenzofos, dioxacarb, dioxathion, disulfoton, dithicrofos, DNOC, doramectin, α-ecdysone, ecdysterone, emamectin, EMPC, empenthrin, endothion, EPN, epofenonane, eprinomectin, esfenvalerate, etaphos, ethiofencarb, ethion, ethiprole, ethoate-methyl, ethoprophos, etofenprox, etrimfos, EXD, famphur, fenamiphos, fenazaflor, fenazaquin, fenchlorphos, fenethacarb, fenfluthrin, fenitrothion, fenobucarb, fenoxacrim, fenoxycarb, fenpirithrin, fenpropathrin, fenpyroximate, fensulfothion, fenthion, fenthion-ethyl, fenvalerate, fipronil, flonicamid, flubendiamide, flubendiamide, flucofuron, flucycloxuron, flucythrinate, flufenerim, flufenoxuron, flufenprox, fluvalinate, tau-fluvalinate, fonofos, formetanate, formothion, formparanate, fosmethilan, fospirate, fosthietan, furathiocarb, furethrin, halfenprox, halofenozide, heptenophos, heterophos, hexaflumuron, hydramethylnon, hydroprene, hyquincarb, imicyafos, imidacloprid, imidacloprid, imiprothrin, indoxacarb, IPSP, isazofos, isocarbophos, isofenphos, isoprocarb, isoprothiolane, isothioate, isoxathion, ivermectin, jasmolin I, jasmolin II, jodfenphos, juvenile hormone I, juvenile hormone II, juvenile hormone III, kinoprene, lepimectin, leptophos, d-limonene, lirimfos, lufenuron, lythidathion, malathion, malonoben, mazidox, mecarbam, mecarphon, menazon, mephosfolan, mesulfenfos, metaflumizone, methacrifos, methamidophos, methidathion, methiocarb, methocrotophos, methomyl, methoprene, methoxyfenozide, metofluthrin, metolcarb, metoxadiazone, mevinphos, mexacarbate, milbemectin, milbemycin oxime, mipafox, monocrotophos, morphothion, moxidectin, natlalofos, naled, nicotine, nitluridide, nitenpyram, nitenpyram, nithiazine, nitrilacarb, novaluron, noviflumuron, omethoate, oxamyl, oxydemeton-methyl, oxydeprofos, oxydisulfoton, parathion, parathion-methyl, pentluoron, permethrin, phenkapton, phenothrin, phenthoate, phorate, phosalone, phosfolan, phosmet, phosmet, phosnichlor, phosphamidon, phoxim, phoxim-methyl, pirimetaphos, pirimicarb, pirimiphos-ethyl, pirimiphos-methyl, prallethrin, precocene I, precocene II, precocene II, primidophos, profenofos, profluthrin, promacyl, promecarb, propaphos, propetamphos, propoxur, prothidathion, prothiofos, prothoate, protrifenbute, pyraclofos, pyrafluprole, pyrazophos, pyresmethrin, pyrethrin I, pyrethrin II, pyrethrins, pyridaben, pyridalyl, pyridaphenthion, pyrifluquinazon, pyrimidifen, pyrimitate, pyriprole, pyriproxyfen, quassia, quinalphos, quinalphos-methyl, quinothion, rafoxanide, resmethrin, rotenone, ryania, sabadilla, schradan, selamectin, silafluofen, sophamide, spinetoram, spinosad, 21-butenyl spinosyns, spirodiclofen, spiromesifen, spirotetramat, sulcofuron, sulfotep, sulfoxaflor, sulprofos, tazimcarb, tebufenozide, tebufenpyrad, tebupirimfos, teflubenzuron, tefluthrin, temephos, TEPP, terallethrin, terbufos, tetrachlorvinphos, tetramethrin, tetramethrin, thiacloprid, thiamethoxam, thicrofos, thiocarboxime, thiocyclam, thiodicarb, thiofanox, thiometon, thiosultap, thuringensin, tolfenpyrad, tralomethrin, transfluthrin, transpermethrin, triarathene, triazamate, triazophos, trichlorfon, trichlormetaphos-3, trichloronat, trifenofos, triflumuron, trimethacarb, triprene, vamidothion, vaniliprole, XMC, xylylcarb and zolaprofos. Especially suitable insecticide active ingredients and derivatives thereof include chlorpyrifos, chlorpyrifos-methyl, clothianidin, cyazypyr, lambda-cyhalothrin, deltamethrin, dinotefuran, flonicamid, flubendiamide, imidacloprid, rynaxypyr, spinetoram, spinosad, 21-butenyl spinosyns, sulfoxaflor, and thiacloprid.

Suitable insecticides for the aqueous based agrochemical composition used in the agrochemical emulsion and with the tank-mix additive include chlorpyrifos, chorpyrifos-methyl, gamma-cyhalothrin, cypermethrin, deltamethrin, halofenozide, methoxyfenozide, sulfoxaflor, spinosad, spinetoram, and tebufenozide.

Examples of fungicides for the aqueous based agrochemical composition used in the agrochemical emulsion and with the tank-mix additive include ametoctradin, amisulbrom, ampropylfos, anilazine, antimycin, azaconazole, azithiram, azoxystrobin, barium polysulfide, Bayer 32394, benalaxyl, benodanil, benomyl, benquinox, bentaluron, benthiavalicarb-isopropyl, benzamacril; benzamacril-isobutyl, benzamorf, benzylaminobenzene-sulfonate (BABS) salt, binapacryl, biphenyl, bismerthiazol, bitertanol, bixafen, blasticidin-S, boscalid, bromuconazole, bupirimate, buthiobate. BYF 1047, captafol, captan, carbamorph, carbendazim, carboxin, carpropamid, carvone. CECA, chlobenthiazone, chloraniformethan, chlorfenazole, 1-chloro-2,4-dinitronaphthalene, chloroneb, chlorothalonil, chlorquinox, chlozolinate, climbazole, copper bis(3-phenylsalicylate), coumarin, cuprobam, cyazofamid, cyclafuramid, cyflufenamid, cymoxanil, cypendazole, cyproconazole, cyprodinil, cyprofuram, dazomet, debacarb, decafentin, diammonium ethylenebis (dithiocarb-amate), dichlofluanid, dichlone, dichloran, 3-(4-chlorophenyl)-5-methylrhodanine, dichlorophen, (RS)—N-(3,5-dichlorophenyl)-2-(methoxymethyl)-succinimide, N-3,5-dichlorophenylsuccinimide, 1,3-dichloro-1,1,3,3-tetrafluoroacetone hydrate, dichlozoline, diclobutrazol, diclocymet, diclomezine, diethofencarb, difenoconazole, difenzoquat ion, diflumetorim, dimethirimol, dimethomorph, dimoxystrobin, diniconazole, diniconazole-M, dinocap, dinocton, dinosulfon, dinoterbon, diphenylamine, dipyrithione, ditalimfos, dithianon, dodemorph, dodemorph acetate, dodicin, dodine, dodine free base, drazoxolon, EBP, edifenphos, enestrobin, epoxiconazole, ESBP, etaconazole, etem, ethaboxam, ethirim, ethoxyquin, N-ethylmercurio-4-toluenesulfonanilide, etridiazole, famoxadone, fenamidone, fenaminosulf, fenapanil, fenarimol, fenbuconazole, fenfuram, fenhexarid, fenitropan, fenoxanil, fenpiclonil, fenpropidin, fenpropimorph, fenpyrazamine, fentin, fentin acetate, fentin hydroxide, ferbam, ferimzone, fluazinam, fludioxonil, flumorph, fluopicolide, fluopyram, fluoroimide, fluotrimazole, fluoxastrobin, fluquinconazole, flusilazole, flusulfamide, flutolanil, flutriafol, fluxapyrad, folpet, formaldehyde, fosetyl, fosetyl-aluminium, fuberidazole, furalaxyl, furametpyr, furcarbanil, furconazole, furconazole-cis, furmecyclox, furophanate, glyodine, griseofulvin, guazatine, guazatine acetates, GY-81, halacrinate, 2-(2-heptadecyl-2-imidazolin-1-yl)ethanol, Hercules 3944, hexaconazole, hexylthiofos, 8-hydroxyquinoline sulfate, hymexazol, ICIA0858, IK-1140, imazalil, imazalil sulfate, imibenconazole, iminoctadine, iminoctadine triacetate, iminoctadine tris(albesilate), ipconazole, iprobenfos, iprodione, iprovalicarb, isopamphos, isoprothiolane, isopyrazam, isotianil, isovaledione, kasugamycin, kasugamycin hydrochloride hydrate, kresoxim-methyl, mancopper, mancozeb, mandipropamid, maneb, mebenil, mecarbinzid, mefenoxam, mepanipyrim, mepronil, meptyl dinocap, meptyldinocap, metalaxyl, metazoxolon, metconazole, methasulfocarb, methfuroxam, methylmercury dicyandiamide, metiram, metominostrobin, metrafenone, metsulfovax, mildiomycin, milneb, mucochloric anhydride, myclobutanil, myclozolin, nabam, natamycin, nickel bis (dimethyldithiocarbamate), N-3-nitrophenylitaconimide, nitrothal-isopropyl, nuarimol, OCH, octhilinone, ofurace, orysastrobin, oxadixyl, oxine-copper, oxpoconazole fumarate, oxycarboxin, pefurazoate, penconazole, pencycuron, penflufen, pentachlorophenol, pentachlorophenyl laurate, penthiopyrad, 2-phenylphenol, phosdiphen, phthalide, picoxystrobin, polyoxin B, polyoxins, polyoxorim, potassium hydroxyquinoline sulfate, probenazole, prochloraz, procymidone, propamocarb, propamocarb hydrochloride, propiconazole, propineb, proquinazid, prothiocarb, prothiocarb hydrochloride, prothioconazole, pyracarbolid, pyraclostrobin, pyraxostrobin, pyrazophos, pyribencarb, pyributicarb, pyridinitril, pyrifenox, pyrimethanil, pyriofenone, pyrometostrobin, pyroquilon, pyroxychlor, pyroxyfur, quinacetol; quinacetol sulfate, quinazamid, quinconazole, quinoclamine, quinoxyfen, quintozene, rabenzazole, *Reynoutria sachalinensis* extract, salicylanilide, sedaxane, silthiofam, simeconazole, sodium 2-phenylphenoxide, sodium pentachlorophenoxide, spiroxamine, SSF-109, sultropen, SYP-048, SYP-Z048, SYP-Z071, tebuconazole, tebufloquin, tecnazene, tecoram, tetraconazole, thiabendazole, thiadifluor, thicyofen, thifluzamide, thiochlorfenphim, 2-(thiocyanatomethylthio)-benzothiazole, thiophanate, thiophanate-methyl, thioquinox, thiram, tiadinil, tioxymid, tolclofos-methyl, tolyltluanid, triadimefon, triadimenol, triamiphos, triarimol, triazbutil, triazoxide, trichlamide, tricyclazole, tridemorph, trifloxystrobin, triflumizole, triforine, triticonazole, UK-2A, derivatives of UK-2A such as, for example, (3S,6S,7R,8R)-8-benzyl-3-(3-(isobutyryloxymethoxy)-4-methoxypicolinamido)-6-methyl-4,9-dioxo-1,5-dioxonan-7-yl isobutyrate which has a CAS Registry Number of 328255-92-1, urbacid, validamycin, valifenate, valiphenal, vinclozolin, XRD-563, zarilamid, zineb, ziram, and zoxamide.

Suitable fungicides for the aqueous based agrochemical composition used in the agrochemical emulsion and with the tank-mix additive include azoxystrobin, bixafen, boscalid, carbendazim, carpropamid, chlorothalonil, derivatives of UK-2A, epoxiconazole, fenbuconazole, fenpropidin, fenpropimorph, fluoxastrobin, flusilazole, fluxapyrad, isopyrazam, isotianil, kasugamycin, mancozeb, meptyldinocap, metconazole, metrafenone, myclobutanil, orysastrobin, penconazole, pencycuron, penthiopyrad, picoxystrobin, probenazole, prochloraz, propiconazole, prothioconazole, pyraclostrobin, quinoxyfen, spiroxamine, tebuconazole, thifluzamide, triadimefon, tricyclazole, tridemorph, trifloxystrobin, and validamycin.

Examples of herbicide safeners for the aqueous based agrochemical composition used in the agrochemical emulsion and with the tank-mix additive include benoxacor, benthiocarb, cloquintocet, daimuron, dichlormid, dicyclonon, dimepiperate, fenchlorazole, fenclorim, flurazole, fluxofenim, furilazole, Harpin proteins, isoxadifen, mefenpyr, mephenate, MG 191, MON 4660, naphthalic anhydride (NA), oxabetrinil, R29148, TI-35, and N-phenyl-sulfonylbenzoic acid amides.

Suitable herbicide safeners for the aqueous based agrochemical composition used in the agrochemical emulsion and with the tank-mix additive include cloquintocet, flurazole, furilazole, isoxadifen, mefenpyr and TI-35.

The agrochemical emulsion of the present disclosure has a pH of 5 to 9.5 measured at a temperature of 23° C. Modifications to the pH of the agrochemical emulsion are typically made using an acid, such as hydrochloric acid, sulfuric acid and/or phosphoric acid, or a base, such as ammonium hydroxide, sodium hydroxide and/or potassium hydroxide, to make pH adjustments to the agrochemical emulsion of the present disclosure.

The present disclosure also provides for a tank-mix additive concentrate, where the tank-mix additive concentrate includes all the components of the agrochemical emulsion described herein, except it does not include the aqueous based agrochemical composition. Specifically, the tank-mix additive concentrate includes the emulsion pre-mix concentrate and the acrylate-based copolymer, where the tank-mix additive concentrate includes a 1:1 to 1:10 ratio by weight of the emulsion pre-mix concentrate to the acrylate-based copolymer and the tank-mix additive concentrate forms an agrochemical emulsion upon dilution in an aqueous based agrochemical composition. Preferably, the tank-mix additive concentrate includes a 1:1 to a 1:5 ratio by weight of the emulsion pre-mix concentrate to the acrylate-based copolymer. Most preferably, the tank-mix additive concentrate includes a 1:1 to a 1:2.5 ratio by weight of the emulsion pre-mix concentrate to the acrylate-based copolymer.

For the various embodiments, the tank-mix additive concentrate has a pH of 5 to 8 measured at a temperature of 23 C. Modifications to the pH of the tank-mix additive concentrate can be made using an acid, such as hydrochloric acid, sulfuric acid and/or phosphoric acid, or a base, such as ammonium hydroxide, sodium hydroxide and/or potassium hydroxide, to make pH adjustments to the tank-mix additive of the present disclosure.

The tank-mix additive concentrate includes the emulsion pre-mix concentrate having 40 to 70 weight percent (wt. %) of the alkylene glycol ether, 10 to 40 wt. % of the vegetable-oil, and the surfactant, where the wt. % of the surfactant is 0.5 to 2 times the wt. % of the vegetable-oil wt. %, as discussed herein for the agrochemical emulsion. The wt. % values of the emulsion pre-mix concentrate are based on the total weight of the emulsion pre-mix concentrate and the wt. % of the alkylene glycol ether, the vegetable-oil and the surfactant total 100 wt. % of the emulsion pre-mix concentrate. The various preferred and most preferred wt. % values for the alkylene glycol ether, the vegetable-oil, and the surfactant discussed herein for the agrochemical emulsion also apply to the tank-mix additive concentrate, and so will not be repeated here. Similarly, the examples and amounts of the various components for the alkylene glycol ether, the vegetable-oil, and the surfactant discussed herein for the agrochemical emulsion also apply to the tank-mix additive concentrate. In addition, the examples and amounts of the acrylate-based copolymer, along with the examples and amounts of the acrylate-based copolymer discussed above for the agrochemical emulsion also apply to the tank-mix additive concentrate.

For the various embodiments, the tank-mix additive concentrate forms an agrochemical emulsion upon dilution in an aqueous based agrochemical composition. For example, the tank-mix additive concentrate forms the agrochemical emulsion, as discussed herein, upon dilution in the aqueous based agrochemical composition, as discussed herein. The tank-mix additive concentrate as described herein may be diluted from 1 to 2000 time in the aqueous based agrochemical composition (e.g., a water-based solution) to form the agrochemical emulsion, as discussed herein. Mixing can take place at atmospheric pressure and at a temperature of 0° C. to 50 C. For the various embodiments, the tank-mix additive concentrate spontaneously forms the agrochemical emulsion without active mixing upon addition of the aqueous based agrochemical composition. Active mixing, however, can be used in forming the agrochemical emulsion from the tank-mix additive concentrate and the aqueous based agrochemical composition.

Embodiments of the present disclosure also provide for a method of reducing spray drift during agrochemical composition spray application, which include providing the tank-mix additive concentrate, as discussed herein, and adding the tank-mix additive concentrate to a spray tank containing an aqueous based agrochemical composition to form the agrochemical emulsion and spraying the agrochemical emulsion from a sprayer.

The methods using the agrochemical emulsion or the tank-mix additive concentrate with the aqueous based agrochemical composition to form the agrochemical emulsion helps to reduce the amount of fine droplets (droplets below 150 μm VMD) by as much as 45 percent as compared to the use of other rheological modifiers under comparable conditions. This reduction in the amount of fine droplets can be beneficial in both aerial and ground spray applications.

As mentioned, the agrochemical emulsion of the present disclosure provides for a reduction in the formation of fine droplet (droplets below 150 μm VMD) during spraying operations. As discussed, the use of the acrylate-based copolymer in the agrochemical emulsion helps to provide spray drift control by reducing the formation of the fine droplets by as much as 45 percent as compared to the use of other rheological modifiers under comparable conditions. The use of the acrylate-based copolymer in the agrochemical emulsion also helps to minimize the formation of larger droplets (droplets having a diameter over 1 mm) compared to the use of other rheological modifiers under comparable conditions.

The tank-mix additive concentrates can be stored in suitable containers at environmental conditions as will be readily recognized by one of skill in the art.

The tank-mix additive concentrates or the agrochemical emulsion of the present disclosure may optionally contain one or more additional compatible ingredients. Also, any other additional ingredients providing functional utility such as, for example, biocides, dyes, stabilizers, fragrance, compatibility agents, organic co-solvents such as, for example, propylene glycol, propylene glycol ethers and/or ethylene glycol ethers and freeze-point depressants may be included in these tank-mix additive concentrates or the agrochemical emulsion. The use of organic co-solvents in the concentrates and spray solutions described herein may provide freezing-point depression and/or enhanced emulsion stability to these compositions.

The emulsion pre-mix concentrate used in the agrochemical emulsion and with the tank-mix additive as described herein may be applied in conjunction with one or more additional active ingredients to control a wide variety of unwanted plants, fungi, or insects. When used in conjunction with the other active ingredients, the presently claimed tank-mix additive and agrochemical emulsion can be formulated with the other active ingredients as premix concentrates, tank mixed with the other active ingredients for spray application or applied sequentially with the other active ingredients in separate spray applications.

EXAMPLES

The following Examples are presented to illustrate various aspects of the compositions and methods described herein and should not be construed as limitations to the claims.

Materials

Canola oil (Crisco® Brand)—Vegetable oil

Atlox™ DP13/6 (Croda)—Phosphate ester surfactant

Atlox™ 4912 (Croda)—Polymeric surfactant

DOWANOL™ DPM (The Dow Chemical Company)—Alkylene glycol ether

ACRYSOL™ ASE-60 (The Dow Chemical Company)—an acid containing, cross-linked acrylic emulsion copolymer.

ACRYSOL™ TT-615 (The Dow Chemical Company)—a tertiary polymer formed with hydrophobic acrylic ester monomers.

ACRYSOL™ 2020-NPR (The Dow Chemical Company)—a nonionic hydrophobically modified ethylene oxide urethane.

Guar Gum (Sigma Aldrich, Product #G4129) is a polysaccharide composed of the sugars glactose and mannose that is isolated from the endosperm of the guar or gavar bean.

Emulsion Concentrate 1

Emulsion Concentrate 1 contains 200 g/kg of canola oil, 200 g/kg of Atlox™ DP13/6, 25 g/kg of Atlox™ 4912 and 575 g/kg of DOWANOL™ DPM. Prepare Emulsion Concentrate 1 by admixing at room temperature (23° C.) 57.5 g DOWANOL™ DPM, 20 g of Canola oil, 20 grams of Atlox™ DP13/6, and 2.5 g of Atlox™ 4912. Mix the admixture with by mild shaking or magnetic stirring to provide 100 g of Emulsion Concentrate 1. Emulsion 1 is prepared by diluting Emulsion Concentrate 1 to a concentration of 0.1 to 1.0 wt. % in deionized water and gently shaking by hand.

Rheological Modifiers

For Examples 1 through 5 seen in Table 1, add the rheological modifier shown to Emulsion 1 in the amounts shown in Table 1 and mix by mild shaking by hand. The pH of the final formulation was adjusted with concentrated aqueous ammonium hydroxide (Fisher Scientific, Pittsburgh, PA, USA) which was added dropwise and while the mixture was agitated with a magnetic stirrer.

Oil-in-Water Emulsion and Spray Droplet Analysis:

The Examples and Comparative Examples seen in Table 1 where diluted with water to prepare a spray solution. Prepare oil-in-water emulsions containing 0.1 and 1.0 wt. % the Example or Comparative Example by diluting 0.5 and 5 mL of the Examples and Comparative Examples as seen in Table 1 with 499.5 and 495 mL, respectively, of deionized water. Adjust the pH of each Example and Comparative Example to the value seen in Table 1 (measured at 23 C). All oil-in-water emulsions were lightly shaken by hand until each was homogenous.

Spray the oil-in-water emulsions of the Examples and Comparative Examples and the control samples using a XR8002VS nozzle (TeeJet Technologies, Glendale Heights, IL, USA) at 40 psi (276 kPa) and a AIXR11002VP nozzle (TeeJet Technologies, Glendale Heights, IL, USA) at 40 psi (276 kPa). Measure the spray droplet size distribution with a Sympatec Helos/KF high resolution laser diffraction particle sizer with an R7 lens (Sympatec GmbH; Clausthal-Zellerfeld, Germany). Situate the tip of the nozzle 12 inches (30.5 centimeters) above the path of the laser beam of the Sympatec particle sizer. Express the percentage of driftable fines as the volume percentage of spray droplets below 150 μm volume mean diameter (VMD) as shown in Table 1.

TABLE 1

| Example | Rheology Modifier Type | wt. % Rheology Modifier (based on solids) | pH | Emulsion Type | wt. % Emulsion 1 | Nozzle XR8002VS < 150 μm | Nozzle AIXR11002VP < 150 μm |
|---|---|---|---|---|---|---|---|
| Comparative Example A | none | 0.0 | | Emulsion 1 | 1.0 | 43.8 ± 1.0 | 19.4 ± 0.6 |
| Comparative Example B | none | 0.0 | | Emulsion 1 | 0.1 | 23.4 ± 1.0 | 8.5 ± 0.6 |
| Comparative Example C | ACRYSOL ™ ASE-60[1] | 0.4 | 9.0-9.5 | none | 0.0 | 44.5 ± 1.0 | 15.1 ± 0.6 |
| Example 1 | ACRYSOL ™ ASE-60[1] | 0.4 | 9.0-9.5 | Emulsion 1 | 0.1 | 26.0 ± 1.0 | 7.1 ± 0.6 |
| Comparative Example D | ACRYSOL ™ RM-2020NPR[2] | 1.0 | 9.0-9.5 | none | 0.0 | 52.3 ± 1.0 | 25.8 ± 0.6 |
| Comparative Example E | ACRYSOL ™ RM-2020NPR[2] | 1.0 | 9.0-9.5 | Emulsion 1 | 0.1 | 35.7 ± 1.0 | 10.5 ± 0.6 |
| Comparative Example F | ACRYSOL ™ TT-615[3] | 0.4 | 9.0-9.5 | none | 0.0 | 44.0 ± 1.0 | 17.0 ± 0.6 |
| Example 2 | ACRYSOL ™ TT-615[3] | 0.4 | 9.0-9.5 | Emulsion 1 | 0.1 | 19.7 ± 1.0 | 7.4 ± 0.6 |
| Example 3 | ACRYSOL ™ ASE-60[1] | 0.4 | 8.9 | Emulsion 1 | 0.1 | — | 6.6 |

± values represent the standard error based on the pooled variance of samples tested with the same nozzle. For reference deionized (or DI) water has volumes of 48.3 ± 1.1% below 150 μm for the XR8002VS nozzle and 22.3 ± 1.2% below 150 μm for the XR8002VS nozzle.

[1]An acid containing, cross-linked acrylic emulsion copolymer.

[2]A nonionic hydrophobically modified ethylene oxide urethane.

[3]A tertiary polymer formed with hydrophobic acrylic ester monomers.

Table 2 provides additional Comparative Data:

TABLE 2

| Example # | Rheology Modifier Type | wt. % Rheology Modifier (based on solids) | pH | Emulsion Type | wt. % Emulsion 1 | Nozzle XR8002VS < 150 μm | Nozzle AIXR11002VP < 150 μm |
|---|---|---|---|---|---|---|---|
| Comparative Example G | ACRYSOL ™ ASE-60 | 0.10 | 9.0-9.5 | none | 0.0 | 42.6 | 18.4 |
| Comparative Example H | ACRYSOL ™ ASE-60 | 1.00 | 9.0-9.5 | none | 0.0 | too thick | too thick |
| Comparative Example I | ACRYSOL ™ RM-2020NPR | 0.10 | 9.0-9.5 | none | 0.0 | 50.0 | 13.8 |
| Comparative Example J | ACRYSOL ™ TT-615 | 0.03 | 9.0-9.5 | none | 0.0 | 47.8 | 21.4 |
| Comparative Example K | ACRYSOL ™ TT-615 | 0.70 | 9.0-9.5 | none | 0.0 | too thick | too thick |
| Comparative Example L | ACRYSOL ™ TT-615 | 1.03 | 9.0-9.5 | none | 0.0 | too thick | too thick |
| Comparative Example M | Guar | 0.03 | — | none | 0.0 | 49.1 | 18.3 |
| Comparative Example N | Guar | 0.10 | — | none | 0.0 | 46.3 | 20.4 |
| Comparative Example O | Guar | 0.41 | — | none | 0.0 | 47.1 | 19.6 |
| Comparative Example P | Guar | 0.71 | — | none | 0.0 | 43.8 | 13.9 |
| Comparative Example Q | Guar | 1.01 | — | none | 0.0 | 41.6 | 13.3 |

FIG. 1 show data from the average of two replicate experiments. FIG. 1 illustrates a reduction in volume of droplets below about 100 μm when ACRYSOL™ ASE-60 is utilized in combination with Emulsion 1 (Example 1) and a reduction of in volume of droplets below the cutoff of 150 μm when ACRYSOL™ TT-615 is utilized in combination with Emulsion 1 using a standard nozzle type XR8002VS as seen in Example 2. This figure further shows that ACRYSOL™ RM-2020 NPR is not effective in reducing the volume of small droplets in combination with Emulsion 1 at these conditions (Comparative Example E).

Figure 2:
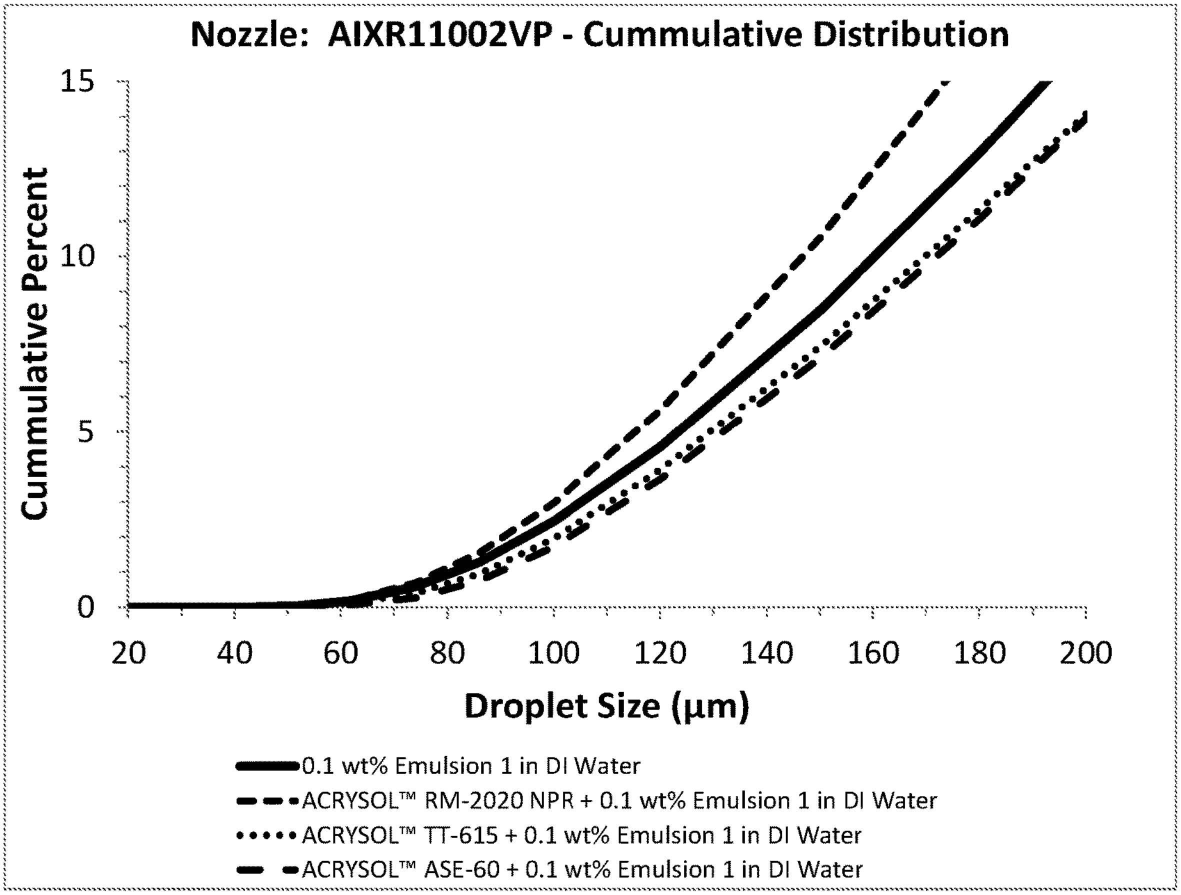
FIG. 2 illustrates a reduction in volume of droplets below the cutoff of 150 μm when either ACRYSOL™ ASE-60 or ACRYSOL™ TT-615 are utilized in combination with Emulsion 1 using an air induction nozzle type AIXR11002VP (Example 1 and Example 2, respectively).

FIG. 2 show data from the average of two replicate experiments. FIG. 2 illustrates a reduction in volume of droplets below the cutoff of 150 μm when either ACRYSOL™ ASE-60 or ACRYSOL™ TT-615 are utilized in combination with Emulsion 1 using an air induction nozzle type AIXR11002VP (Example 1 and Example 2, respectively). FIG. 2 further shows that ACRYSOL™ RM-2020 NPR is not effective in reducing the volume of small droplets in combination with Emulsion 1 at these conditions (Comparative Example E).

Figure 3:
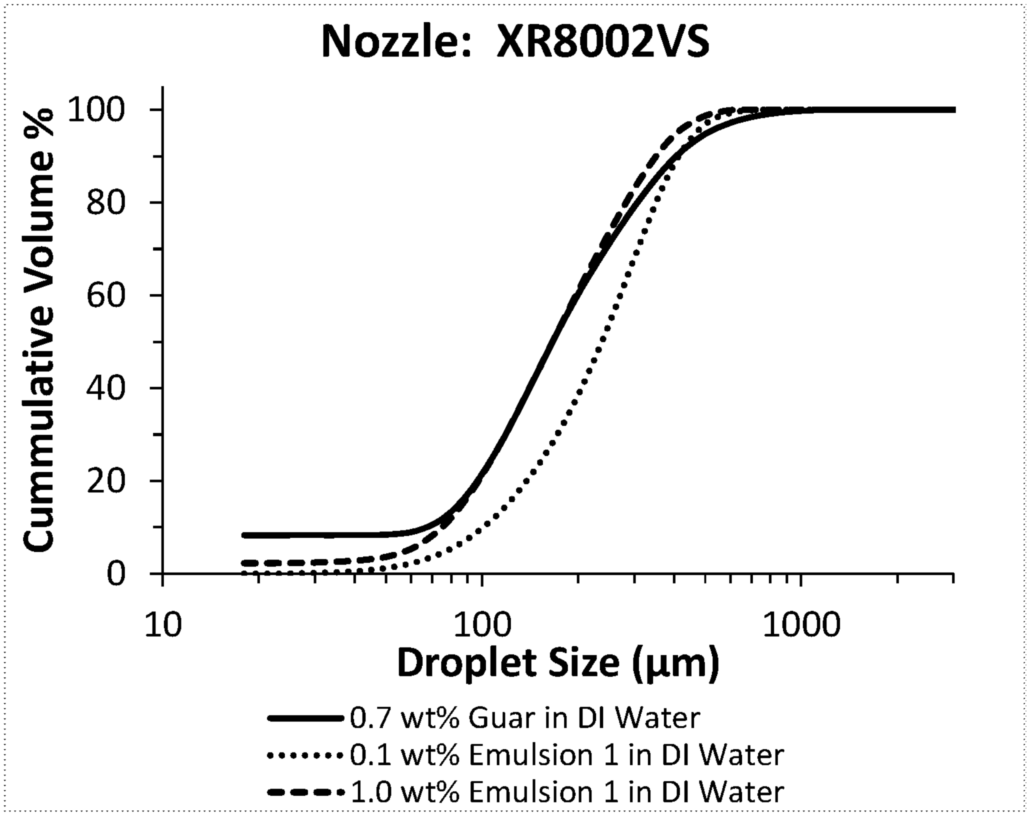
FIG. 3 illustrates the effect of guar gum in changing particle size distribution versus Emulsion 1 at 0.1 and 1.0 wt. % (Comparative Example P, Comparative Example A and Comparative Example B).

FIG. 3 shows the effect of guar gum in changing particle size distribution versus Emulsion 1 at 0.1 and 1.0 wt. % (Comparative Example P, Comparative Example A and Comparative Example B). FIG. 3 also illustrates the cumulative distribution where guar gum has a larger percentage of droplets above about 400 to 500 μm for the 0.1 wt. % Emulsion 1 which also shows dramatically improved (i.e. lower) amounts of small droplets (i.e. those <150 μm) (Comparative Example A and Comparative Example B).

Figure 4:
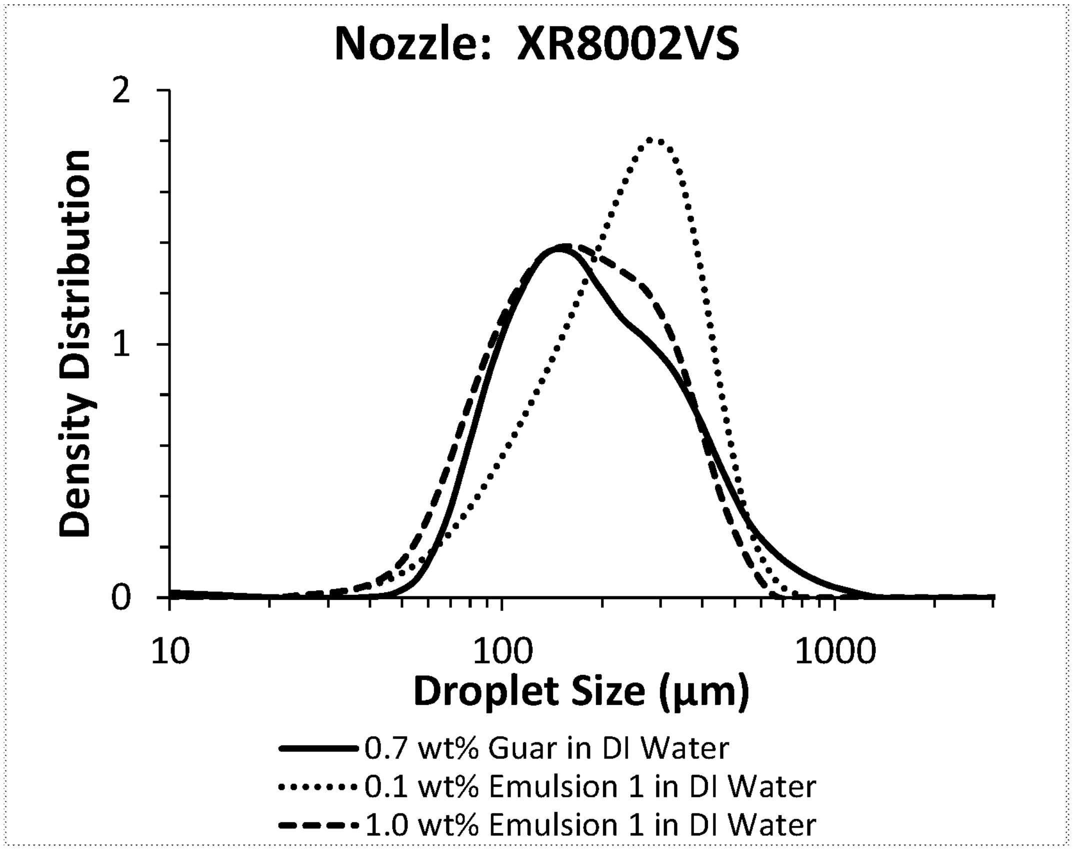
FIG. 4 shows the same data plotted in FIG. 3 as a density distribution rather than a cumulative distribution.

Finally, FIG. 4 shows the same data plotted in FIG. 3 as a density distribution rather than a cumulative distribution. This clearly shows the benefit of the emulsion technology as a narrower and tailored distribution that eliminates both the low and high droplet sizes more effectively than guar gum for the 0.1 wt. % Emulsion 1 (Comparative Example A and Comparative Example B) and for the 1.0 wt. % Emulsion 1 shows similar quantities of small droplets <150 μm, but reduced quantities of droplets >400 μm.

Relative to Comparative Example B, Examples 1-3 had the following percent reduction of in volume of droplets below the cutoff of 150 μm when using the AIXR11002VP nozzle: Example 1 a 16.5% reduction, Example 2 a 12.9% reduction and Example 3 a 22.4% reduction. Additionally, Example 3 has 15.8% reduction in volume of droplets below the cutoff of 150 μm versus Comparative Example B for the XR8002VS nozzle.

What is claimed is:

1. An agrochemical emulsion, comprising:
- an emulsion pre-mix concentrate that includes:
  - 40 to 70 weight percent (wt. %) of an alkylene glycol ether;
  - 10 to 40 wt. % of a vegetable-oil; and
  - a surfactant, wherein the wt. % of the surfactant is 0.5 to 2 times the wt. % of the vegetable-oil wt. %, wherein the wt. % values are based on the total weight of the emulsion pre-mix concentrate and the wt. % of the alkylene glycol ether, the vegetable-oil and the surfactant total 100 wt. % of the emulsion pre-mix concentrate;
- an acrylate-based copolymer, wherein the acrylate-based copolymer has a weight average molecular weight of 0.5 to 1.5 million; and
- an aqueous based agrochemical composition, wherein the agrochemical emulsion includes 0.05 to 5 weight percent (wt. %) of the emulsion pre-mix concentrate, 0.05 to 5 wt. % of the acrylate-based copolymer and 90 to 99.9 wt. % of the aqueous based agrochemical composition.

2. The agrochemical emulsion of claim 1, wherein the acrylate-based copolymer is an acrylate-based random copolymer formed with monomers (A), (B) and (C), where monomer (A) is an α,β ethylenically unsaturated carboxylic acid monomers; monomer (B) is a nonionic, copolymerizable α,β ethylenically unsaturated monomer and monomer (C) is a hydrophobically modified α, β ethylenically unsaturated carboxylic acid monomer.

3. The agrochemical emulsion of claim 2, wherein the acrylate-based random copolymer of monomers (A), (B) and (C) is formed with 30 to 60 wt. % of monomer (A), 30 to 50 wt. % of monomer (B) and 0 to 15 wt. % of monomer (C), where the wt. % is based on the total weight of the acrylate-based random copolymer and the monomers (A), (B) and (C) total 100 wt. %.

4. The agrochemical emulsion of claim 2, wherein monomer (A) is methacrylic acid or acrylic acid; monomer (B) is ethyl acrylate, methyl methacrylate or butyl acrylate; and monomer (C) is a methacrylated alkyl EO/PO ester with a hydrophobic modification with 10 to 22 carbons.

5. The agrochemical emulsion of claim 1, wherein the alkylene glycol ether is selected from the group consisting of propylene glycol n-butyl ether, dipropylene glycol methyl ether, dipropylene glycol n-propyl ether, propylene glycol n-propyl ether, dipropylene glycol n-butyl ether, ethylene glycol monohexyl ether, ethylene glycol mono-n-propyl ether, diethylene glycol monohexyl ether, ethylene glycol mono-n-propyl ether, diethylene glycol monohexyl ether, diethylene glycol monobutyl ether, triethylene glycol monobutyl ether or combinations thereof.

6. The agrochemical emulsion of claim 1, wherein the vegetable-oil is selected from the group consisting almond oil, canola oil, soybean oil, rapeseed oil, olive oil, castor oil, sunflower seed oil, coconut oil, corn oil, cotton seed oil, linseed oil, palm oil, peanut oil, safflower oil, sesame oil, tung oil or combinations thereof.

7. The agrochemical emulsion of claim 1, wherein the vegetable-oil is a methylated vegetable-oil.

8. The agrochemical emulsion of claim 1, wherein the surfactant is a phosphate ester surfactant, a polymeric surfactant or combinations thereof.

9. The agrochemical emulsion of claim 1, wherein the aqueous based agrochemical composition contains an herbicide, an insecticide, a fungicide or combinations thereof.

10. A tank-mix additive concentrate forming an agrochemical emulsion, comprising:
- an emulsion pre-mix concentrate that includes:
  - 40 to 70 weight percent (wt. %) of an alkylene glycol ether;
  - 10 to 40 wt. % of a vegetable-oil; and
  - a surfactant, wherein the wt. % of the surfactant is 0.5 to 2 times the wt. % of the vegetable-oil wt. %, wherein the wt. % values of the emulsion pre-mix concentrate are based on the total weight of the emulsion pre-mix concentrate and the wt. % of the alkylene glycol ether, the vegetable-oil and the surfactant total 100 wt. % of the emulsion pre-mix concentrate; and
- an acrylate-based copolymer, wherein the acrylate-based copolymer has a weight average molecular weight of 0.5 to 1.5 million; and
- wherein the tank-mix additive concentrate includes a 1:1 to 1:10 ratio by weight of the emulsion pre-mix concentrate to the acrylate-based copolymer and the tank-mix additive concentrate forms the agrochemical emulsion upon dilution in an aqueous based agrochemical composition.

11. The tank-mix additive concentrate of claim 10, wherein the acrylate-based copolymer is an acrylate-based random copolymer formed with monomers (A), (B) and (C), where monomer (A) is an α, β ethylenically unsaturated carboxylic acid monomers; monomer (B) is a nonionic, copolymerizable α, β ethylenically unsaturated monomer and monomer (C) is a hydrophobically modified α, β ethylenically unsaturated carboxylic acid monomer.

12. The tank-mix additive concentrate of claim 11, wherein the acrylate-based random copolymer of monomers (A), (B) and (C) is formed with 30 to 60 wt. % of monomer (A), 30 to 50 wt. % of monomer (B) and 0 to 15 wt. % of monomer (C), where the wt. % is based on the total weight of the acrylate-based random copolymer and the monomers (A), (B) and (C) total 100 wt. %.

13. The tank-mix additive concentrate of claim 11, wherein monomer (A) is methacrylic acid or acrylic acid; monomer (B) is ethyl acrylate, methyl methacrylate or butyl acrylate; and monomer (C) is a methacrylated alkyl EO/PO ester.

14. The tank-mix additive of claim 10, wherein the alkylene glycol ether is selected from the group consisting of propylene glycol n-butyl ether, dipropylene glycol methyl ether, dipropylene glycol n-propyl ether, propylene glycol n-propyl ether, dipropylene glycol n-butyl ether, ethylene glycol monohexyl ether, ethylene glycol mono-n-propyl ether, diethylene glycol monohexyl ether, ethylene glycol mono-n-propyl ether, diethylene glycol monohexyl ether, diethylene glycol monobutyl ether, triethylene glycol monobutyl ether or combinations thereof.

15. The tank-mix additive of claim 10, wherein the vegetable-oil is selected from the group consisting almond oil, canola oil, soybean oil, rapeseed oil, olive oil, castor oil, sunflower seed oil, coconut oil, corn oil, cotton seed oil, linseed oil, palm oil, peanut oil, safflower oil, sesame oil, tung oil or combinations thereof.

16. The tank-mix additive of claim 10, wherein the vegetable-oil is a methylated vegetable-oil.

17. The tank-mix additive of claim 10, wherein the surfactant is a phosphate ester surfactant, a polymeric surfactant or combinations thereof.

18. The tank-mix additive of claim 10, wherein the tank-mix additive concentrate has a pH of 5 to 8 measured at a temperature of 23° C.

19. A method of reducing spray drift during agrochemical composition spray application, comprising:

providing a tank-mix additive concentrate of claim 10; and adding the tank-mix additive concentrate to a spray tank with an aqueous based agrochemical composition to form an agrochemical emulsion; and spraying the agrochemical emulsion from a sprayer.

20. The method of claim 19, wherein the aqueous based agrochemical composition includes a herbicide, an insecticide, a fungicide or combinations thereof.

* * * * *